Dec. 9, 1958  H. W. COLE, JR  2,863,536
SELF-LOCKING STRAIGHT LINE ACTUATOR
WITH LOAD RELEASE RE-ACTION
Filed April 14, 1955  2 Sheets-Sheet 1
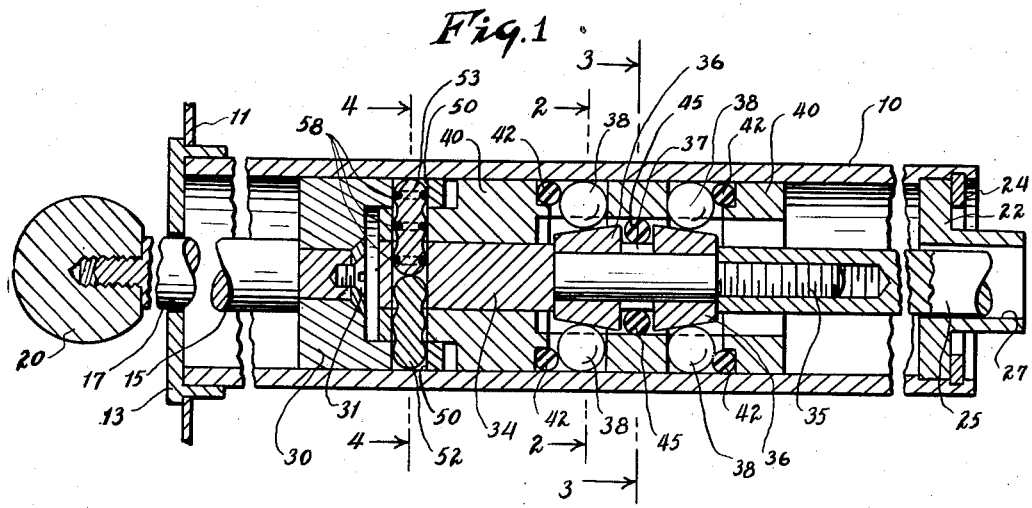
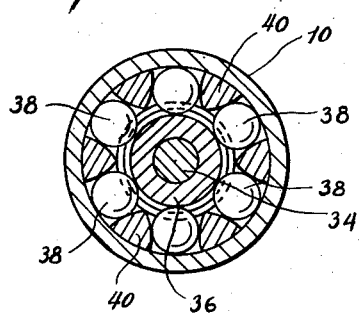
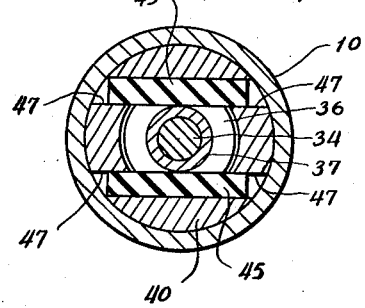
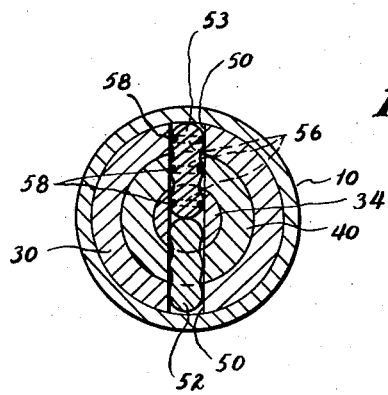
INVENTOR.
Howard W. Cole, Jr
BY
Emery, Varney,
Whittemore & Dix
ATTORNEYS Dec. 9, 1958
H. W. COLE, JR
2,863,536
SELF-LOCKING STRAIGHT LINE ACTUATOR
WITH LOAD RELEASE RE-ACTION
Filed April 14, 1955
2 Sheets-Sheet 2
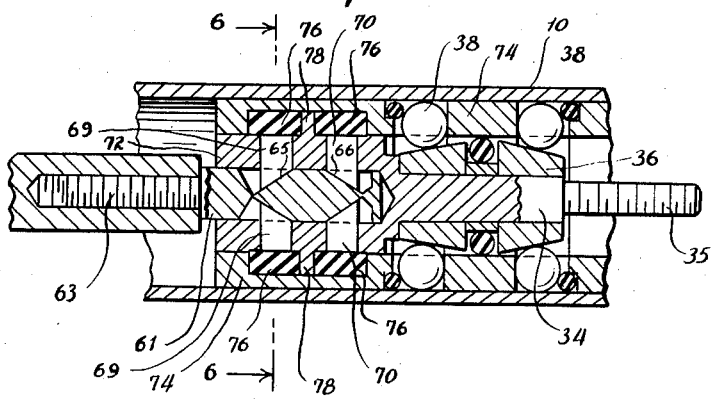
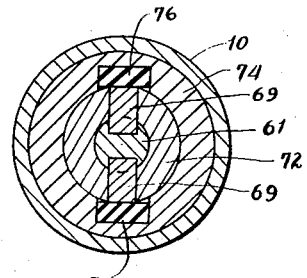
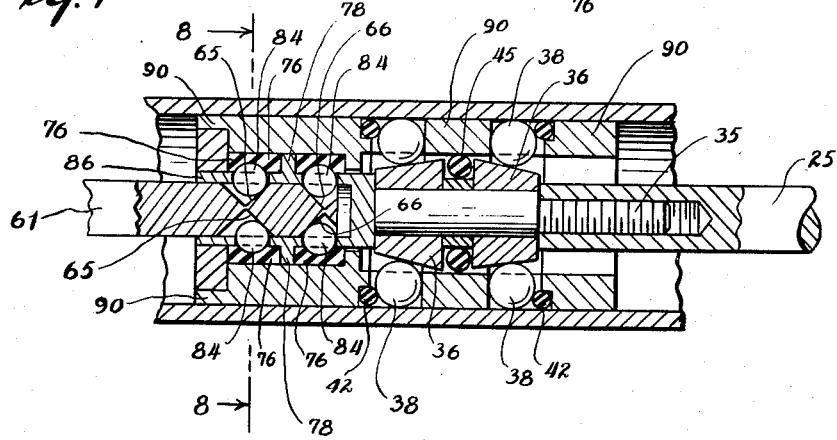
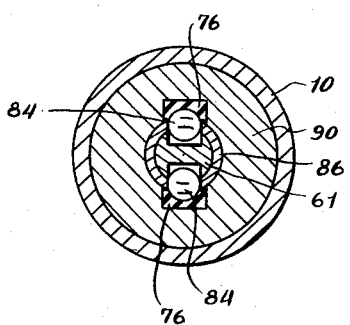
INVENTOR.
Howard W. Cole, Jr.
BY
Emery, Varney,
Whittemore & Dix
ATTORNEYS

United States Patent Office 2,863,536
Patented Dec. 9, 1958

2,863,536

SELF-LOCKING STRAIGHT LINE ACTUATOR WITH LOAD RELEASE RE-ACTION

Howard W. Cole, Jr., Mountain Lakes, N. J.

Application April 14, 1955, Serial No. 501,326

13 Claims. (Cl. 192—8)

This invention relates to actuators for transmitting motion from an operator to a load, and more especially to straight line actuators which are self-locking in any position. The invention is more especially concerned with self-locking actuators, of the character indicated, which have overrunning clutches oriented in opposite directions and connected so that one or the other of the clutches will jam to prevent movement of the load in either direction.

It is an object of the invention to provide a self-locking actuator which will release more easily than the actuators of the prior art. In actuators of the type with which this invention is concerned, movement of a primary shaft or operator in either direction releases the clutch which was resisting movement of the load in that direction and permits the load to be moved into a new position. When the load is heavy, the clutches wedge with considerable force and this force must be released by the movement of the primary shaft.

In accordance with one feature of this invention, the force exerted by the operator to move the clutch elements out of locked position sets up a reaction force to move the cam surfaces in the opposite direction. Thus, the load which is wedging the clutch elements is relieved and the clutch elements are easily released.

Although the invention can be embodied in various construction, only a few of which will be described herein, the basic feature of the construction in the provision of motion-transmitting connections, which are moved by the operator, and which exert reactions in opposite directions, one against the clutch elements to move them downwardly on the cam means and the other against the cam means themselves to move them in a direction to release the clutch elements.

Other objects, features and advantages of the invention will appear or be pointed out as the description proceeds.

In the drawing, forming a part hereof, in which like reference characters indicate corresponding parts in all the views:

Figure 1 is a sectional view through a straight line actuator embodying this invention;

Figures 2, 3 and 4 are sectional views taken on the lines 2—2, 3—3 and 4—4, respectively of Figure 1;

Figure 5 is a fragmentary view, similar to Figure 1, but showing a modified form of the invention;

Figure 6 is a sectional view taken on the line 6—6 of Figure 5;

Figure 7 is a fragmentary sectional view, similar to Figure 1, but showing a second modified form of the invention; and Figure 8 is a sectional view taken on the line 8—8 of Figure 7.

The construction shown in Figure 1 includes a cylindrical housing 10 connected to a bulkhead 11, or other fixed support. The housing 10 has an end wall 13 with an opening therein for a shaft 15. The wall of the opening provides a bearing surface 17 on which the shaft 15 is movable longitudinally with reciprocating motion. The shaft 15 has a knob 20 at one end for manually operating the shaft, but it will be understood that this knob 20 is merely representative of means for imparting longitudinal movement to the shaft 15, and such movement may be imparted by a hydraulic motor or any other operator.

The housing 10 has another end wall 22 fitted into a counterbore in the housing and held in place by a snap ring 24. There is an opening through the end wall 22 for another shaft 25 and the wall of the opening provides a bearing surface 27 in which the shaft 25 is movable longitudinally with reciprocating motion. This construction is merely representative of a fixed bearing in which the shaft 25 is free to slide.

The end of the shaft 15, opposite the knob 20, is of reduced diameter and fits into a frame 30. This frame 30 is secured to the shaft 15 by a screw 31, or in any other suitable way. The shaft 15 and frame 30 constitute the "primary operating element" of the actuator.

The shaft 25 is of composite construction and has an extension 34 connected to it by threads 35. On this extension 34 there are cam means 36 comprising two frusto-conical cam elements rigidly secured to the shaft extension 34 and axially spaced from one another by a bushing 37. The shaft 25 and extension 34 comprise the "secondary operated element" of the actuator; and the shaft 25 is connected to the load which the actuator is intended to move into any desired position and to hold in such position.

There are clutch elements 38 located between the cam means 36 and the inside wall of the housing 10. The clutch elements 38 are balls in the illustrated construction, but rollers can be used, if desired. The clutch elements 38 are held in radially extending openings in a carrier 40, as best shown in Figure 2. Six clutch elements are used in the construction illustrated, but more or fewer clutch elements can be used, the minimum being three.

Referring again to Figure 1, the openings in the carrier 40 are slightly longer than the diameter of the clutch elements 38 and the clutch elements are urged toward the high ends of their respective cam surfaces by resilient means 42 which are rubber O-rings in the illustrated construction. These resilient means 42 hold the clutch elements 38 in positions where they contact simultaneously with the inside surface of the housing 10 and the surface of the cam means 36. Thus, the clutch elements 38 of the right-hand clutch are in position to jam immediately against the housing 10 if the shaft 25 begins to move toward the right in Figure 1. Similarly, the clutch elements 38 of the left-hand clutch are in position to jam immediately against the housing 10 if the shaft 25 begins to move toward the left in Figure 1. The two overrunning clutches thereby lock the shaft 25 and its connected load against movement in either direction.

The primary shaft 15 is connected to the carrier 40 through motion-transmitting connections which will be described hereinafter; and the carrier 40 is connected to the secondary shaft through a lost-motion connection which includes two pins 45 which pass across the circumferential groove between the confronting end faces of the frusto-conical cam elements which are spaced by the bushing 37. These pins 45 have their opposite ends in openings 47, best shown in Figure 3. Longitudinal movement of the primary shaft 15 is transmitted to the secondary shaft 25, in either direction, as soon as the lost motion provided by the pins 45, has been taken up. This lost motion is necessary, however, in order to permit release of the overrunning clutches by the primary operating element preparatory to the moving of the shaft 25 and its connected load into a new position.

In the construction illustrated, the housing 10 is the fixed member of each of the overrunning clutches; the cam means 36 are the movable members of the overrunning clutches, and the carrier 40 holds the clutch elements 38 of both clutches. The carrier 40 slides longitudinally in the housing 10 as a bearing; and the left-hand end of the carrier 40 provides a sleeve in which the extension 34 slides. The right-hand end of the frame 30 surrounds the end portions of both the carrier 40 and the shaft extension 34.

This right-hand end of the frame 30 has radially extending openings 50 in alignment with corresponding openings through the carrier 40 and a corresponding opening through the shaft extension 34. All of these openings are in alignment and they provide a housing for levers 52 and 53. These levers can be of identical construction, but different constructions are shown for the respective levers in Figure 1 in order to illustrate modified constructions.

Describing first the lever 52, this element has spherical end portions, the lower of which fits into the opening 50 of the frame 30 and the upper of which fits into the corresponding opening in the shaft extension 34. An intermediate portion of the lever 52 is shaped to have a spherical zone surface located within the opening through the carrier 40. These spherical surfaces of the lever 52 bear against the walls of the openings in which the lever 52 is located.

If the clutch elements 38 of the left-hand clutch are wedged tightly against the housing 10, they are resisting movement of the shaft 25 and load toward the left in Figure 1, and in order to permit the shaft 15 to move the shaft 25 and load into a new position, movement of the shaft 15 toward the left must release the left-hand clutch. When the shaft 15 and the frame 30 start their movement toward the left, the lower end of the lever 52 moves toward the left with the frame 30. Because of the wedging action of the clutch, both the shaft extension 34, which carries the cam means 36, and the carrier 40 which bears against the right-hand faces of the wedged balls, resist movement by the shaft 15.

The resistance offered by the carrier 40 to movement by the lever 52, as the bottom of the lever 52 moves toward the left, tends to rock the lever 52 about its point of contact with the carrier 40 and his causes the upper end of the lever 52 to exert a force toward the right against the extension 34. The intermediate surface of the lever 52 is thus urging the carrier 40 in a direction to push the clutch elements 38 of the left-hand clutch toward the low end of the cam surfaces, and the upper end of the lever 52 urges the cam means 36 toward the right, away from the clutch elements 38, to relieve the load which is holding the clutch elements 38 jammed against the walls of the housing 10.

In actual operation, either the carrier 40 or the shaft extension 34, which connects with the cam means 36, may move first; but as soon as there is movement of either one, the clutch is released and both are free to move in opposite directions. Either the upper end or the intermediate bearing surface of the lever 52 may act as the fulcrum, therefore, in the releasing of the clutch.

The lever 53 operates in the same way as the lever 52 and at the same time. The only difference in their construction is that the lever 53 has three circumferential grooves 56, and there is a rubber O-ring 58 in each of the grooves 56 and extending beyond the surfaces of the lever 53. These O-rings 58 are merely representative of soft, resilient pads on the surfaces of the lever 53 which contact with the surfaces of the frame 30, carrier 40 and shaft extension 34. The purpose of these resilient pads is to provide a tight fit for the lever 53 and to make the lever give longer service without developing wear and resulting play.

Figure 5 shows a modified form of the invention. The clutch mechanism is the same as in Figure 1; and the only difference in construction is in the primary operating element and the shapes of the other parts by which motion is transmitted from the primary operating element to the carrier and the cam means. At the end of the shaft 15 there is a shaft extension 61 which fits into a bore in the shaft 15, and which is connected to the shaft 15 by threads 63.

The shaft extension 61 has notches with sloping faces providing cam surfaces 65 and 66. These notches receive the ends of plungers 69 and 70 respectively, which have their lower ends sloped to match the cam surfaces 65 and 66.

The extension 34 of the load-connected shaft of the actuator has a tubular end portion 72 into which the extension 61 fits, and in which the extension 61 has longitudinal sliding movement. There are openings through the tubular portion 72 for holding the plungers 69, the plungers being slidable in their openings in directions generally normal to the longitudinal axis of the actuator. Movement of the shaft extension 61 toward the left with respect to the tubular portion 72, in Figure 5, causes the cam surfaces 65 to thrust their associated plungers 69 outwardly, and leaves the other plungers 70 free to move inwardly as the cam surfaces 66 move away from the plungers 70.

A carrier 74 is similar to the carrier 40 of Figure 1, except at the left end where the carrier 74 surrounds the tubular portion 72 and provides a bearing in which the tubular portion 72 slides. There are recesses in the inside wall of the carrier 74 filled with rubber 76 or other deformable material. Flanges 78 extend from the tubular portion 72 into the recesses in the carrier 74 and divide each recess into two parts, one over each of the plungers. The end walls of the recesses are on opposite sides of the flanges 78 and confront the opposite faces of the flanges.

The rubber 76 preferably fills the spaces between the flanges 78 and the confronting end faces of the carrier recesses within which the rubber 76 is located.

In the operation of the apparatus shown in Figure 5, movement of the shaft extension 61 causes plungers 69 or 70 to be thrust outwardly by the cam surface 65 or 66, depending upon the direction of the movement, and this outward thrust of the plungers deforms the rubber 76 in the recess on one side or the other of the flanges 78. Deformation of the rubber 76 on the left hand side of the flanges 78 causes the rubber 76 to expand in directions parallel to the axis of the shaft extensions 61 and 34, and this increase in the longitudinal dimension of the rubber 76 thrusts the carrier 74 in one direction and the flanges 78, shaft extension 34 and cam means 36 in the opposite direction. Thus the cam surfaces 65 and 66, the plungers 69, the tubular portion 72 and rubber 76 provide motion transmitting connections whereby movement of the primary shaft 15 urges the clutch element carrier 74 in one direction while exerting a reaction force to urge the cam means 36 in the opposite direction.

Figure 7 shows another modified form of the invention in which balls 84 are substituted for the plungers 69 and 70 of Figure 5. Cam surfaces 65 and 66 in the shaft extension 61 displace the balls 84 which are held in openings through a tubular portion 86 of the shaft extension 34. The tubular portion 86 operates in the same way as the tubular portion 72 of Figure 5, but is made with a thinner side wall because of the shorter dimensions of the balls 84 in a radial direction with respect to the axis of the shaft extension 61.

There are flanges 78 on the tubular portion 86 of shaft extension 61, and there are pads of rubber 76, or other deformable material, in recesses in the inner face of the left-hand end portion of a carrier 90. This carrier 90 is similar to the carrier 40 of Figure 1, and the carrier 74 of Figure 5, except for the shape and construction of the left-hand end for accommodating the rubber pads 76 into which the balls 74 are pressed.

The operation of the structure shown in Figure 7 is essentially the same as that shown in Figure 5 except that the balls 84 exert pressure having horizontal as well as radial components and this increases the tendency of the rubber pads 76 to be displaced longitudinally, that is, parallel to the axis of the shaft extension 61. The balls 84 do not provide the same feature of construction whereby the rubber 76 can be confined in a closed chamber because some spreading of the rubber around the surface of the balls 84 can take place when they are pressed more firmly into contact with the rubber.

The preferred constructions of the invention have been illustrated and described, but other changes and modifications can be made and some features can be used in different combinations without departing from the invention as defined in the claims.

What is claimed is:

1. A self-locking straight line actuator comprising a primary operating element for reciprocating movement by an operator, a secondary operated element for connection with a load, two overrunning clutches oriented in opposite directions, each of the clutches including a fixed clutch member, a movable clutch member, cam means on the movable clutch member, and a group of clutch elements between the clutch members of each clutch and movable into engagement with the fixed clutch element to lock that clutch, a carrier for the clutch elements of both clutches, a connection between the movable clutch member and the secondary operated element, and motion-transmitting connections through which the primary operating element is connected with both the movable clutch element and the carrier, at least a part of said connections having lost motion therein, and said motion-transmitting connections including means that extend from the primary operating element and between the carrier and the movable clutch element in positions where the thrust of said means against the carrier is in the opposite direction from the thrust of said means against the movable clutch in response to the initiation of movement of the primary actuator in either direction to unlock either of the clutches.

2. The straight line actuator described in claim 1 and in which the primary and secondary elements are shafts, and in which there are bearings on which the shafts have longitudinal reciprocating movement, the fixed clutch member comprising a housing in which the clutch elements and cam means are enclosed, and the clutch elements comprising circular pieces that substantially fill the space between the cam means and the inside of the housing.

3. The straight line actuator described in claim 1 and in which the primary and secondary elements are shafts and there are bearings in which these shafts have longitudinal reciprocating movement, the fixed clutch member comprising a housing, the cam means including two frusto-conical surfaces connected with the secondary shaft and movable longitudinally as a unit therewith, the clutch elements being circular pieces that roll on the cam surfaces and jam against the inside surface of the housing, resilient means urging the clutch elements of each clutch toward the large diameter end of the cam means and the motion-transmitting connections including a lost-motion connection between the carrier and the cam means for moving the cam means longitudinally with the carrier when the lost-motion is taken up.

4. The straight line actuator described in claim 1 and in which the primary element includes a frame at the clutch end of said primary element, and the frame has a recess in it in alignment with a complementary recess in the carrier, and the motion-transmitting connections between the primary element and the carrier extend from a portion of the cam means through said recesses to the frame.

5. The straight line actuator described in claim 1 and in which the motion-transmitting connections between the primary element and the carrier include at least one lever operably connected at one end with the primary element and operably connected at its opposite end with the cam means and provided with a fulcrum in the carrier at a location intermediate the operable connections with the primary element and the cam means.

6. The straight line actuator described in claim 1 and in which there are other cam surfaces on the primary element and the motion-transmitting connections between the primary element and the carrier include plungers extending through a portion of the secondary element and deformable material in alignment with the plungers and located between confronting faces of the secondary element and the carrier, the faces extending transversely of the direction of reciprocating movement of the carrier and the secondary element so that movement of the plungers by the cam surfaces in a direction to deform the material produces longitudinal movement of the carrier with respect to the secondary element.

7. The straight line actuator described in claim 1 and in which a sleeve is connected to the secondary element in axial alignment therewith, and the primary element extends into the sleeve and is aligned therewith, two groups of balls at axially spaced locations along the sleeve and located in radial openings through the sleeve, the primary element having recesses therein for receiving a portion of each ball, the sides of the recesses providing cam surfaces for thrusting the balls radially outwardly in response to axial movement of the primary element with respect to the sleeve of the secondary element, an outwardly extending flange on the sleeve between the groups of balls, a portion of the carrier surrounding the groups of balls and the flange with inside faces of the carrier on opposite sides of the flange and confronting the opposite faces of the flange, rubber rings substantially filling the space between each side of the flange and the confronting face of the carrier, the balls being recessed into the rubber rings so that movement of the balls radially outwardly deforms the rubber rings and produces axial movement of the carrier with respect to the sleeve of the secondary element.

8. A straight line actuator comprising two overrunning clutches oriented in opposite directions so that one or the other engages in response to movement in opposite directions, each overrunning clutch including a fixed member, a movable member with cam means thereon, and clutch elements between the members in position to be jammed against the fixed member in response to axial movement of the cam means, means connecting the movable clutch member with a load, a carrier for the clutch elements, and motion-transmitting means connecting the carrier with an operator, said motion-transmitting means including an element in contact with both the carrier and the movable clutch element and in position to press them in opposite directions to release the clutches in response to axial movement of the operator.

9. The straight line actuator described in claim 8 and in which the motion-transmitting means comprises a lever having rounded surfaces near its opposite ends and another rounded surface intermediate its ends, the different rounded surfaces bearing against surfaces of the movable clutch member, the carrier and the operator, respectively.

10. The straight line actuator described in claim 8 and in which the motion-transmitting means comprises a lever having a groove near each of its opposite ends and another groove intermediate the opposite ends, and resilient pads extending outwardly from the lever beyond the surfaces thereof and into contact with surfaces of the movable clutch member, the carrier and the operator, respectively.

11. A straight line actuator including two overrunning clutches turned in opposite directions and operated into a locked condition by a load-connected element to hold said element against movement in either of said opposite directions, and an operator-operated mechanism connected with the clutches and including an element that thrusts simultaneously in opposite directions to remove the load from a selected one of the clutches and to move the clutch into an unlocked condition.

12. In a straight line actuator having two over-running clutches facing in opposite directions and movable along a straight line to lock and hold a load-connected element against movement, a primary actuator, and pressure means operated by the actuator including a device that simultaneously exerts force in opposite directions to relieve the load on one or the other clutch and at the same time unlock that clutch.

13. A straight line actuator including a load-connected element, a primary operating element for moving the load-connected element, overrunning clutch means movable along a straight line and having complementary wedging means operated by the load-connected element to lock it against movement in at least one direction, and means operated by the primary operating element and including a device that exerts simultaneous thrust in opposite directions against different parts of said complementary wedging means for relieving the load in the locked clutch means and moving said clutch means in a direction to unlock it.

References Cited in the file of this patent

UNITED STATES PATENTS

| | | |
|---|---|---|
| 843,253 | Barker | Feb. 5, 1907 |
| 1,225,355 | Pogue | May 8, 1917 |
| 2,300,023 | Swartz | Oct. 27, 1942 |
| 2,573,939 | Verville et al. | Nov. 6, 1951 |

FOREIGN PATENTS

| | | |
|---|---|---|
| 369,960 | France | Jan. 25, 1907 |
| 370,361 | Italy | Apr. 14, 1939 |